United States Patent Office 3,730,788
Patented May 1, 1973

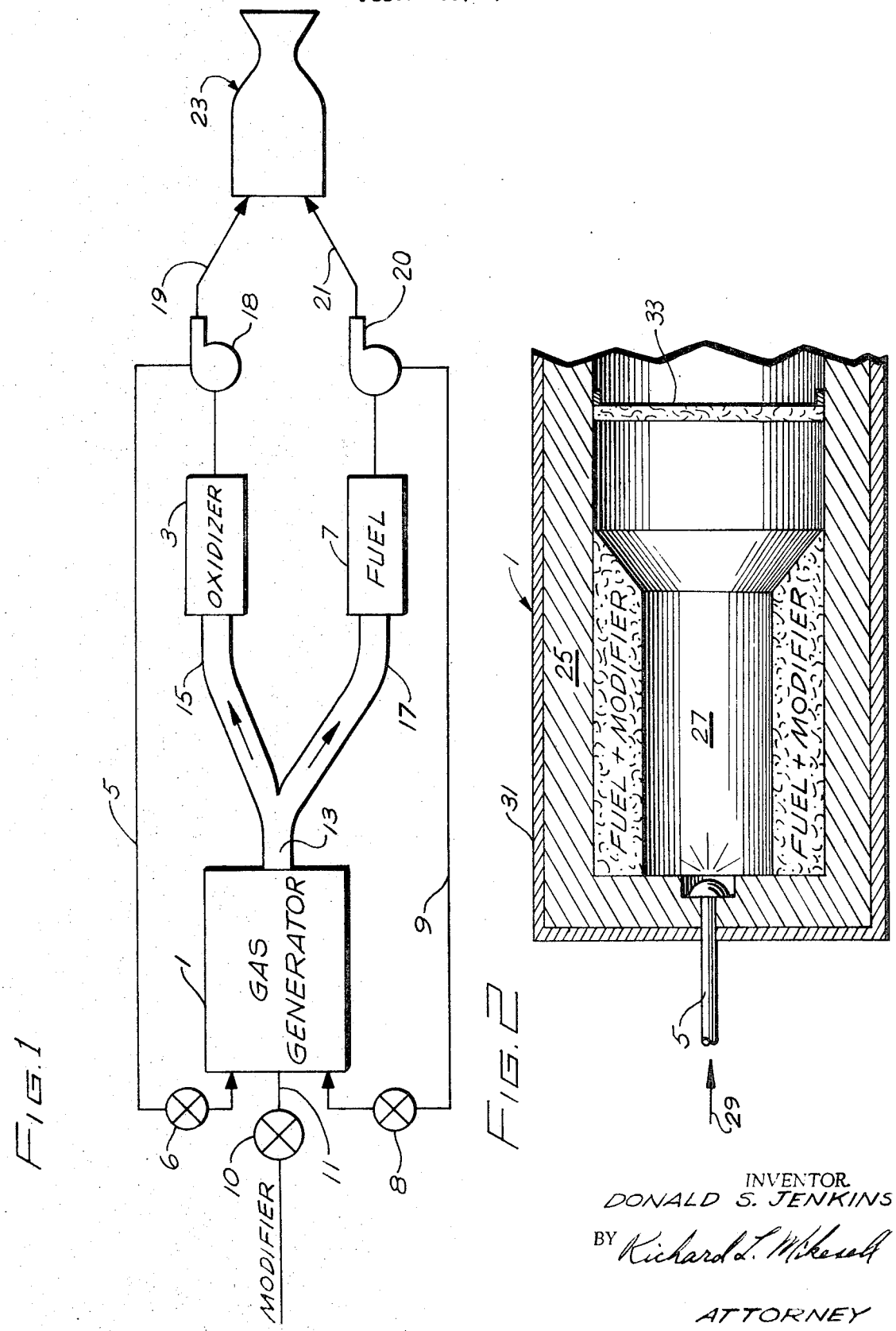

3,730,788
FLUORINE OXIDIZER GAS GENERATOR
Donald S. Jenkins, Tarzana, Calif., assignor to North American Rockwell Corporation
Filed Dec. 4, 1967, Ser. No. 687,896
Int. Cl. C06b 15/00
U.S. Cl. 149—1
2 Claims

ABSTRACT OF THE DISCLOSURE

A gas generator pressurization device using a fluorine oxidizer, a fuel and a fuel-like modifier selected from the group consisting of hexachloroethane ($C_2Cl_6$), hexabromoethane ($C_2Br_6$), 1,2,3,4-tetrazole ($CHN_4H$), 1,2,4,5-tetrazine ($N_2CHN_2CH$), and cyanuric chloride ($C_3Cl_3N_3$)

The presently preferred fuel-like modifier is cyanuric chloride.

BACKGROUND OF THE INVENTION

Many liquid fuel rockets use pressurized propellant tanks. As the propellant is emptied from the tank, the increasing ullage of the tank is filled with some pressurizing fluid, usually a gas. This pressurizing fluid has the two-fold effect of preventing the collapse of the tank and of providing additional impetus of the propellant towards the engine.

PRIOR ART

Frequently in the prior art, the gases used to pressurize the propellant tanks have been generated by a gas generator supplying the combustion products from a small portion of the engine's oxidizer and fuel backfed to the gas generator. This could be termed a "bootstrap" gas generator. However, as more exotic fluorine oxidizers have come to be used, this otherwise satisfactory boostrap operation has been found to have some disadvantages. If the gas generator operates in an oxidizer rich condition, highly corrosive fluorine compounds comprise the exhaust of the gas generator. These corrosive products act upon the lines, valves and tanks in the system. This is especially disadvantageous in systems with a long performance life and in systems that must have a restart capability. On the other hand, if the gas generator is run in a fuel-rich mode, the exhaust gases comprise unburned fuels which are manifestly unsuitable for pressurizing the highly reactive fluorine oxidizer. Some success has been achieved in pressurizing reactive oxidizers with fuel-rich gases by interposing expulsion bladders between the oxidizer and the gas. However, the fluorine oxidizers are so reactive that most prior art expulsion bladders are not chemically compatible with the fluorine oxidizer. It has been found to be, in practice, practically impossible to run a gas generator at stoichiometrically precise operating levels such that neither free fluorine nor unoxidized fuel is in the exhaust. This practical impossibility arises, in part, from the necessarily high temperature of the exhaust from the gas generator. This high temperature tends to promote the thermal cracking of combustion products from the generator, yielding reactive fluorine compounds, such as ClF, $F_2$ and atomic fluorine.

It is an object of this invention to provide a gas generator and a process for gas generation suitable for pressurizing oxidizer and fuel tanks.

It is another object of this invention to provide a gas generator and a process for gas generation suitable for pressurizing oxidizer tanks containing fluorine compounds.

It is a further object of this invention to provide a gas generator and a process for gas generation suitable for use in a bootstrap mode.

SUMMARY OF THE INVENTION

The above and other objects of this invention are accomplished by combusting in the gas generator, in addition to a fluid fluorine oxidizer and a fuel, a fuel-like modifier whose combustion products are not reactive with fluorine oxidizers, do not contain a substantial amount of free fluorine, are non-soluble in oxidizers and propellants, and are non-condensible at operating temperatures and pressures. Compounds which meet these criterion include compounds selected from the group consisting of hexachloroethane ($C_2Cl_6$), hexabromoethane ($C_2Br_6$), 1,2,3,4-tetrazole ($CHN_4H$), 1,2,4,5-tetrazine ($N_2CHN_2CH$), and cyanuric chloride ($C_3Cl_3N_3$). The presently preferred fuel-like modifier is cyanuric chloride.

It should be noted that the primary combustion products of these fuel-like modifiers are, as previously set forth, not reactive with fluorine oxidizers, do not comprise a substantial amount of free fluorine or reactive halogens, are non-soluble in oxidizers and propellants, and are non-condensible at operating temperatures and pressures. In a few instance the combustion products will be hypergolic with exceedingly reactive fuels. In these cases, an expulsion bladder, as referred to, supra, is preferably used in the fuel tank. Past experience has shown expulsion bladders to be more compatible with fuels than with highly reactive fluorine compounds.

BRIEF DESCRIPTION OF THE DRAWING

Referring now to the drawings:

FIG. 1 is a schematic diagram of a liquid rocket propellant system comprising the gas generator of the instant invention.

FIG. 2 is a cross-sectional view of a gas generator built according to the principles of the instant invention.

Referring to FIG. 1, a rocket engine 23 is fed fluorine oxidizer from a tank 3. The fluorine oxidizer is impelled into the engine by a fluorine oxidizer pump 18. The engine 23 is fed fuel from a fuel tank 7, said fuel being impelled by a fuel pump 20. A gas generator 1 is capable of being fed fluorine oxidizer from the oxidizer pump 18 via a fluorine oxidizer conduit 5. It is also capable of being fed fuel from the main fuel pump 20 via a fuel conduit 9. Additionally, the fuel-like modifier of the instant invention is fed to the gas generator via a modifier conduit 11. The combustion products 13 of the gas generator travel via conduits 15 and 17 to the fuel tank 7 and the fluorine oxidizer tank 3. The main bulk of the fuel and fluorine oxidizer flow via oxidizer line 19 and fuel line 21 to a rocket engine 23. The oxidizer flow to the gas generator 1 is controlled and varied by a control valve 6 on oxidizer conduit 5. The fuel flow to the gas generator is controlled and varied by a control valve 8 on fuel conduit 7. The flow of the fuel-like modifier is controlled and varied by a valve 10 on modifier conduit 11.

Referring now to FIG. 2, a gas generator 1 built according to the principles of the instant invention is shown in cross-section. This gas generator is not of the bootstrap type. Rather, a cylindrical pressing 25 of a mixture of fuel and fuel-like modifier defines a combustion volume 27. The fuel used can be, for instance, graphite, boron, beryllium, aluminum, or lithium. Boron is the preferable fuel. A fluorine oxidizer 29 is injected into the gas generator combustion volume 27 via an oxidizer conduit 5. This fluorine oxidizer can be oxidize from the main oxidizer tank of the downstream motor, or fluorine oxidizer from a separate source.

The outer wall 31 of the gas generator 1 is preferably of some insulated material so as to confine the heat generated in the combustion zone 27. It is additionally desirable to provide a filter 33 at the downstream end of the generator 1 so as to prevent particles of fuel and modifier composition 25 from entering the downstream gas generator conduit. The flow of the fluorine oxidizer 29 is variably controlled so as to provide the proper flame temperature and gas volume desired. In general it is desirable that the gases emitting from the gas generator be between 1200° F. and 1800° F. Naturally, the gas volume desired is a function of the size of the downstream propellant tanks.

The configuration of FIG. 2 presupposes the use of a solid fuel and modifier. However, if either fuel or modifier or both are pumpable, a different configuration can readily be used. This configuration is implied in FIG. 1. In this configuration, the fuel, modifier and oxidizer would be injected into the combustion zone, producing hot gases. Of course, if the fuel of the rocket is used, it will be in a pumpable form. On the other hand, the modifier of choice, cyanuric chloride, is normally in a solid state. Accordingly, it can be either dissolved or slurried and forced into the gas generator combustion zone, or be already present in the combustion zone in a solid form.

Flourine containing oxidizers suitable for use in gas generators in the instant invention include, but are not limited to, fluorine and fluorine compounds such as trifluoromine oxide ($NF_3O$), tetrafluorohydrazine ($N_2F_4$), nitrogen trifluoride ($NF_3$), difluoromine ($HNF_2$), chlorodifluoromine ($ClNF_2$), chlorine trifluorine ($ClF_3$), chlorine pentafluoride ($ClF_5$), bromine pentafluoride ($BrF_5$), bromine trifluoride ($BrF_3$3), perchloryl fluoride ($FClO_3$), fluoronitroform [$FC(NO_2)_3$], bis-fluoroxi-difluoromethane ($CH_2(OF)_2$), oxitrifluorochloride $$(OClF_3),$$

oxygen difluoride ($OF_2$), nitryl fluoride ($FNO_2$), fluorine, and mixtures thereof.

It will be appreciated, of course, that some combustion products of the fuel-like modifier of the instant invention will be unsuitable for pressurizing cryogenic or space storable propellants. If cyanuric chloride is used as the modifier, for instance, the combustion product $CF_4$ will condense in space storable oxidizers causing contamination of the propellant and a loss of pressurization potential. However, these cryogenic or space storable oxidizers are still suitable for use as an oxidizer in the gas generator of the instant invention. Examples of these cryogenic or space storable oxidizers are oxygen difluoride and fluorine.

It should also be appreciated that the selection of fuel in the gas generator in the instant invention must involve some judgment on the part of the practitioner. It is generally desirable to minimize the amount of hydrogen in the fuel as the combustion of hydrogen with fluorine gives the highly reactive compound HF. Accordingly, fuel such as lithium and boron are preferred fuels. However, if some HF is tolerable, then other prior art fuels can be used in the propulsion system of choice. Among these are hydrogen, hydrogen/lithium, methane, RP–1, unsymmetrical dimethyl hydrazine, hydrazine, ammonia, pentaborane, diborane, ethyldecaborane, alcohol, gasoline and kerosene.

The amount of modifier used can be readily calculated. For instance, the unbalanced equation of a complete combustion of chlorine trifluoride oxidizer, boron fuel, and cyanuric chloride modifier would be $$ClF_3 + C_3N_3Cl_3 + B \rightarrow CF_4 + N_2 + BF_3 + BCl_3$$

It can be seen that none of the products of this reaction are reactive with fluorine oxidizers, do not comprise reactive fluorine compounds, are non-soluble in fluorine oxidizers and are non-condensible at normal temperatures and pressures. As indicated above, this particular system is not suitable for the pressurization of cryogenic propellants. The balanced equation for the combustion of one mole of cyanuric chloride with chlorine trifluoride and boron would be:

$$7.5ClF_3 + C_3N_3Cl_3 + 7B \rightarrow 3CF_4 + 1.5N_2 + 3.5BF_3 + 3.5BCl_3$$

It can be seen that weight mixture ratios can be readily computed from this equation changing the moles to their weight equivalents as $$\frac{oxidizer}{modifier+fuel} = \frac{7.5ClF_3}{C_3N_3Cl_3+7B}$$

$$= \frac{7.5\ (92.5)}{1(194.5)+7(10.8)} = 2.54$$

the modifier: fuel ratio would be $$\frac{C_3N_3Cl_3}{7B} = \frac{1(194.5)}{7(10.8)} = 2.57$$

From these figures, those skilled in the art can readily adjust the valving in their particular system to give these propellant ratios. In practice, of course, slight deviations from the ideal stoichiometric ratios may be necessitated by the parameters of a particular system. Similar calculations can readily be performed for any fuel-oxidizer-modifier combination.

Since it is obvious that many changes and modifications can be made in the above described details without departing from the nature and spirit of the invention, it is to be understood that the invention is not to be limited thereto except as set forth in the appended claims.

I claim:
1. A gas generator propellant combination comprising:
   an oxidizer selected from the group consisting of fluorine and fluorine compounds,
   a fuel, and
   a fuel-like modifier selected from the group consisting of hexachloroethane, hexabromoethane, 1,2,3,4-tetrazole, 1,2,4,5-tetrazine and cyanuric chloride.
2. The gas generator composition of claim 1 wherein the modifier is cyanuric chloride.

References Cited
UNITED STATES PATENTS

| | | | |
|---|---|---|---|
| 3,103,456 | 9/1963 | Lawton et al. | 149—1 |
| 3,170,282 | 2/1965 | Kirshenbaum et al. | 149—1 X |
| 3,260,630 | 7/1966 | Logan et al. | 149—1 |
| 3,406,117 | 10/1968 | Cook | 149—1 |

CARL D. QUARFORTH, Primary Examiner

S. J. LECHERT, JR., Assistant Examiner

U.S. Cl. X.R.

149—22, 87, 36